United States Patent
Song et al.

(10) Patent No.: US 11,310,670 B2
(45) Date of Patent: Apr. 19, 2022

(54) NETWORK CAPACITY ADJUSTMENT USING EXPERIENCE BLOCKING RATIO

(71) Applicant: Huawei Technologies Co., Ltd., Shenzhen (CN)

(72) Inventors: Jiantao Song, Shanghai (CN); Qiyong Zhao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 69 days.

(21) Appl. No.: 16/545,754

(22) Filed: Aug. 20, 2019

(65) Prior Publication Data
US 2019/0373478 A1 Dec. 5, 2019

Related U.S. Application Data

(63) Continuation of application No. PCT/CN2017/074112, filed on Feb. 20, 2017.

(51) Int. Cl.
*H04W 16/04* (2009.01)
*H04W 24/08* (2009.01)

(52) U.S. Cl.
CPC ........... *H04W 16/04* (2013.01); *H04W 24/08* (2013.01)

(58) Field of Classification Search
CPC . H04W 24/08; H04W 16/04; H04W 28/0252; H04W 28/0268
See application file for complete search history.

(56) References Cited

U.S. PATENT DOCUMENTS

| | | | |
|---|---|---|---|
| 5,764,740 A | | 6/1998 | Holender |
| 6,128,322 A | * | 10/2000 | Rasanen ............... H04W 28/06 370/536 |
| 2003/0193954 A1 | | 10/2003 | Benmohamed et al. |
| 2004/0068556 A1 | | 4/2004 | Radpour |
| 2004/0214577 A1 | | 10/2004 | Borst et al. |
| 2009/0067333 A1 | | 3/2009 | Ergen et al. |

(Continued)

FOREIGN PATENT DOCUMENTS

| | | |
|---|---|---|
| CN | 1540956 A | 10/2004 |
| CN | 101111045 A | 1/2008 |

(Continued)

OTHER PUBLICATIONS

Translation Liu et al (CON Publication No. 101304612), 2011 (Year: 2011).*

*Primary Examiner* — Ian N Moore
*Assistant Examiner* — Sun Jong Kim
(74) *Attorney, Agent, or Firm* — Leydig, Voit & Mayer, Ltd.

(57) ABSTRACT

A network capacity adjustment is described herein. The network device determines an experience blocking ratio of a cell based on a quantity of concurrent users of the cell and a quantity of equivalent channels of the cell, determines an experience blocking ratio of a cell based on a traffic volume distribution model in the cell, or determines an experience blocking ratio of a cell based on an actual experience rate of each session and a required single-user experience rate. The quantity of equivalent channels of the cell are adjusted based on the experience blocking ratio of the cell. A network capacity of the cell is adjusted based on the experience blocking ratio of the cell, so that an adjusted network capacity of the cell can satisfy user experience.

12 Claims, 5 Drawing Sheets

(56) References Cited

U.S. PATENT DOCUMENTS

| | | |
|---|---|---|
| 2010/0015926 A1 | 1/2010 | Luff |
| 2014/0170986 A1* | 6/2014 | Blaunshtein .......... H04W 16/18 455/67.13 |
| 2015/0120907 A1 | 4/2015 | Niestemski et al. |
| 2018/0070245 A1 | 3/2018 | Liao et al. |

FOREIGN PATENT DOCUMENTS

| | | |
|---|---|---|
| CN | 101304612 A | 11/2008 |
| CN | 101715197 A | 5/2010 |
| CN | 102547777 A | 7/2012 |
| CN | 102573072 A | 7/2012 |
| CN | 102083106 B | 7/2014 |
| CN | 104902570 A | 9/2015 |
| CN | 105120481 A | 12/2015 |
| CN | 105407494 A | 3/2016 |
| CN | 105704737 A | 6/2016 |

* cited by examiner

NETWORK CAPACITY ADJUSTMENT USING EXPERIENCE BLOCKING RATIO

CROSS-REFERENCE TO RELATED APPLICATIONS

This application is a continuation of International Patent Application No. PCT/CN2017/074112, filed on Feb. 20, 2017, the disclosure of which is hereby incorporated by reference in its entirety.

TECHNICAL FIELD

Embodiments of the present invention relate to communications technologies, and in particular, to a network capacity adjustment method and a network device.

BACKGROUND

With continuous network scale-up and emergence of new services, operators propose higher requirements on network efficiency, reliability, and security. Due to increasingly fierce market competition, the operators are looking for effective approaches to maximally increase network value. Therefore, during early-stage network planning, modeling analysis needs to be performed on a network capacity and traffic by using a scientific method, to satisfy requirements of customers.

In a conventional voice network, a key indicator for network planning is a call loss rate, and the call loss rate is calculated by using an Erlang B formula or an Erlang C formula. However, because a voice service and a data service have different characteristics, both the Erlang B formula and the Erlang C formula are applicable only to the voice network instead of a data network. In the voice network, if a voice service arrives, the voice service is blocked when channels are all occupied. In the data network, a user of a data service can still access a network system when channels are all occupied. A new accessing user affects experience of concurrent users in the network system, degrading the experience of all the concurrent users. For example, for a video service, stalling occurs or video quality is reduced. For a file download or web browsing service, a download delay is increased. In addition, arrival processes of the voice service and the data service are different. A Poisson arrival process is mainly presented for the voice service. However, the data service has not only a Poisson arrival process but also an arrival process such as power-law distribution.

Currently, for the data network, during network planning, a channel capacity is calculated based on an average quantity of concurrent users of the network and a required single-user experience rate. The average quantity of concurrent users of the network is an average value of a quantity of users simultaneously served by a cell or the network in a unit time, and the required single-user experience rate is a pre-defined fixed value. Statistics about a cell-level or network-wide average value is collected during calculation of the average quantity of concurrent users of the network. Therefore, experience satisfaction statuses of different users are concealed, and it is difficult to satisfy a user experience requirement by using an obtained channel capacity. It is difficult to satisfy a requirement by using an existing network capacity calculation method especially for a data network, for example, a mobile broadband (MBB) network, aiming at satisfying user experience.

SUMMARY

Embodiments of the present invention provide a network capacity adjustment method and a network device, to adjust a network capacity of a cell based on an experience blocking ratio of the cell, so that an adjusted network capacity of the cell can satisfy user experience.

A first aspect of the embodiments of the present application provides a network capacity adjustment method, including: obtaining, by a network device, a quantity of concurrent users of a cell in a unit time in a statistics period; determining an experience blocking ratio of the cell in the statistics period based on the quantity of concurrent users of the cell in the unit time and a quantity of equivalent channels of the cell; and adjusting the quantity of equivalent channels of the cell based on the experience blocking ratio. According to the method, when a network capacity of the cell is adjusted, the experience blocking ratio of the cell is determined based on the quantity of concurrent users of the cell, and then the network capacity of the cell is adjusted based on the experience blocking ratio of the cell, so that an adjusted network capacity of the cell can satisfy user experience.

With reference to the first aspect, in a first possible implementation of the first aspect, the determining, by the network device, an experience blocking ratio of the cell in the statistics period based on the quantity of concurrent users of the cell in the unit time and a quantity of equivalent channels of the cell is specifically: calculating, by the network device, an unsatisfied traffic volume and a satisfied traffic volume of the cell in the unit time; calculating, by the network device, an unsatisfied traffic volume and a satisfied traffic volume of the cell in the statistics period based on the unsatisfied traffic volume and the satisfied traffic volume of the cell in the unit time; and obtaining, by the network device, the experience blocking ratio of the cell based on a ratio of the unsatisfied traffic volume of the cell in the statistics period to a total traffic volume.

With reference to the first possible implementation of the first aspect, in a second possible implementation of the first aspect, the calculating, by the network device, an unsatisfied traffic volume and a satisfied traffic volume of the cell in the unit time is specifically: when the quantity of concurrent users of the cell in the unit time is greater than the quantity of equivalent channels of the cell, the unsatisfied traffic volume of the cell in the unit time=the quantity of concurrent users of the cell in the unit time, and the satisfied traffic volume of the cell in the unit time=0; or when the quantity of concurrent users of the cell in the unit time is less than or equal to the quantity of equivalent channels of the cell, the unsatisfied traffic volume of the cell in the unit time=0, and the satisfied traffic volume of the cell in the unit time=the quantity of concurrent users of the cell in the unit time; or when the quantity of concurrent users of the cell in the unit time is greater than the quantity of equivalent channels of the cell, the satisfied traffic volume of the cell in the unit time=the quantity of concurrent users of the cell in the unit time*an actual single-user rate/a required single-user rate, and the unsatisfied traffic volume of the cell in the unit time=the quantity of concurrent users of the cell in the unit time*(1−the actual single-user rate/the required single-user rate); or when the quantity of concurrent users of the cell in the unit time is less than or equal to the quantity of equivalent channels of the cell, the unsatisfied traffic volume of the cell in the unit time=0, and the satisfied traffic volume of the cell in the unit time=the quantity of concurrent users of the cell in the unit time.

With reference to the first aspect or the first and the second possible implementations of the first aspect, in a third possible implementation of the first aspect, the adjusting, by the network device, the quantity of equivalent channels of the cell based on the experience blocking ratio is specifically: determining, by the network device, whether the experience blocking ratio is greater than a preset target experience blocking ratio; when the experience blocking ratio is greater than the target experience blocking ratio, querying, by the network device, a blocking ratio table based on the target experience blocking ratio, to obtain a quantity of equivalent channels that is of the cell and that corresponds to the target experience blocking ratio, where the blocking ratio table includes a correspondence between a quantity of equivalent channels of the cell, an experience blocking ratio, and a traffic volume; and adjusting, by the network device, the quantity of equivalent channels of the cell to the quantity of equivalent channels that is of the cell and that corresponds to the target experience blocking ratio.

A second aspect of the embodiments of the present application provides a network capacity adjustment method, including: obtaining, by a network device, a traffic volume statistical result of a cell in a statistics period; determining a traffic volume distribution model of the cell in the statistics period and a parameter of the traffic volume distribution model based on the statistical result; determining an experience blocking ratio of the cell based on a quantity of equivalent channels of the cell, the traffic volume distribution model, and the parameter of the traffic volume distribution model; and adjusting the quantity of equivalent channels of the cell based on the experience blocking ratio. According to the method, the experience blocking ratio of the cell is determined based on the traffic volume distribution model in the cell, and then a network capacity of the cell is adjusted based on the experience blocking ratio of the cell, so that an adjusted network capacity of the cell can satisfy user experience.

With reference to the second aspect, in a first possible implementation of the second aspect, the determining, by the network device, an experience blocking ratio of the cell based on a quantity of equivalent channels of the cell, the traffic volume distribution model, and the parameter corresponding to the traffic volume distribution model is specifically: determining a used blocking ratio table based on the parameter corresponding to the traffic volume distribution model; and querying the blocking ratio table based on the quantity of equivalent channels of the cell and the traffic volume distribution model, to obtain the experience blocking ratio of the cell, where the blocking ratio table includes a correspondence between a quantity of equivalent channels of the cell, a traffic volume, a traffic volume distribution model, and an experience blocking ratio.

With reference to the second aspect, in a second possible implementation of the second aspect, the determining, by the network device, an experience blocking ratio of the cell based on a quantity of equivalent channels of the cell, the traffic volume distribution model, and the parameter corresponding to the traffic volume distribution model is specifically: determining, based on the traffic volume distribution model, a blocking ratio calculation formula corresponding to the traffic volume distribution model; and substituting the parameter corresponding to the traffic volume distribution model and the quantity of equivalent channels of the cell into the blocking ratio calculation formula corresponding to the traffic volume distribution model, to obtain the experience blocking ratio of the cell.

With reference to the second aspect or the first and the second possible implementations of the second aspect, in a third possible implementation of the first aspect, the adjusting, by the network device, the quantity of equivalent channels of the cell based on the experience blocking ratio is specifically: determining, by the network device, whether the experience blocking ratio is greater than a preset target experience blocking ratio; when the experience blocking ratio is greater than the target experience blocking ratio, querying, by the network device, the blocking ratio table based on the target experience blocking ratio, to obtain a quantity of equivalent channels that is of the cell and that corresponds to the target experience blocking ratio, where the blocking ratio table includes the correspondence between the quantity of equivalent channels of the cell, the traffic volume, the traffic volume distribution model, and the experience blocking ratio; and adjusting, by the network device, the quantity of equivalent channels of the cell to the quantity of equivalent channels that is of the cell and that corresponds to the target experience blocking ratio.

With reference to the second aspect or the first to the third possible implementations of the second aspect, in a fourth possible implementation of the second aspect, the experience blocking ratio includes a hard experience blocking ratio and/or a soft experience blocking ratio.

With reference to the second aspect or the first to the fourth possible implementations of the second aspect, in a fifth possible implementation of the second aspect, the obtaining, by a network device, a traffic volume statistical result of a cell in a statistics period includes: delivering, by the network device, configuration information of a traffic volume detection parameter of the cell to a traffic volume detection device, where the configuration information includes identification information of the cell, information about the statistics period, and information about the unit time for statistics; and receiving, by the network device, the statistical result from the traffic volume statistics device.

A third aspect of the embodiments of the present application provides a network capacity adjustment method, including: obtaining, by a network device, a data volume of a session in a cell in a statistics period and a delay of the session; calculating an actual experience rate of the session based on the data volume of the session and the delay of the session; calculating a blocking ratio of the session based on the actual experience rate of the session and a preset required single-user experience rate; calculating an experience blocking ratio of the cell based on the experience blocking ratios of the session; and adjusting a quantity of equivalent channels of the cell based on the experience blocking ratio of the cell. According to the method, the experience blocking ratio of the cell is determined based on actual experience rates of a plurality of sessions in the cell and a single-user experience rate, and then a network capacity of the cell is adjusted based on the experience blocking ratio of the cell, so that an adjusted network capacity of the cell can satisfy user experience.

With reference to the third aspect, in a first possible implementation of the third aspect, the calculating, by the network device, a blocking ratio of the session based on the actual experience rate of the session and a preset required single-user experience rate is specifically: when the actual experience rate of the session is greater than or equal to the required single-user experience rate, the blocking ratio of the session is 0; or when the actual experience rate of the session is less than the required single-user experience rate, the blocking ratio of the session is 1.

With reference to the third aspect, in a second possible implementation of the third aspect, the calculating, by the network device, a blocking ratio of the session based on the actual experience rate of the session and a preset required single-user experience rate is specifically: when the actual experience rate of the session is greater than or equal to the required single-user experience rate, the blocking ratio of the session is 0; or when the actual experience rate of the session is less than the required single-user experience rate, the blocking ratio of the session is $HL[i]=1-ET[i]/\theta$, where $ET[i]$ represents the actual experience rate of the session, and $\theta$ represents the required single-user experience rate.

With reference to the third aspect or the first and the second possible implementations of the third aspect, in a third possible implementation of the third aspect, the adjusting, by the network device, a quantity of equivalent channels of the cell based on the experience blocking ratio of the cell is specifically: determining, by the network device, whether the experience blocking ratio of the cell is greater than a preset target experience blocking ratio; when the experience blocking ratio of the cell is greater than the target experience blocking ratio, querying, by the network device, a blocking ratio table based on the target experience blocking ratio, to obtain a quantity of equivalent channels that is of the cell and that corresponds to the target experience blocking ratio, where the blocking ratio table includes a correspondence between a quantity of channels of the cell, a traffic volume, and an experience blocking ratio; and adjusting, by the network device, the quantity of equivalent channels of the cell to the quantity of equivalent channels that is of the cell and that corresponds to the target experience blocking ratio.

With reference to the third aspect or the first to the third possible implementations of the third aspect, in a fourth possible implementation of the third aspect, the data volume of the session is obtained by subtracting a volume of data transmitted in the last transmission time unit from a total volume of successfully transmitted data, and the delay of the call is obtained by subtracting the last transmission time unit from a sum of a wait delay and a scheduling delay.

A fourth aspect of the embodiments of the present application provides a network device, including: an obtaining module, configured to obtain a quantity of concurrent users of a cell in a unit time in a statistics period; a determining module, configured to determine an experience blocking ratio of the cell in the statistics period based on the quantity of concurrent users of the cell in the unit time and a quantity of equivalent channels of the cell; and an adjustment module, configured to adjust the quantity of equivalent channels of the cell based on the experience blocking ratio.

With reference to the fourth aspect, in a first possible implementation of the fourth aspect, the determining module is specifically configured to: calculate an unsatisfied traffic volume and a satisfied traffic volume of the cell in the unit time; calculate an unsatisfied traffic volume and a satisfied traffic volume of the cell in the statistics period based on the unsatisfied traffic volume and the satisfied traffic volume of the cell in the unit time; and obtain the experience blocking ratio of the cell based on a ratio of the unsatisfied traffic volume of the cell in the statistics period to a total traffic volume.

With reference to the first possible implementation of the fourth aspect, in a second possible implementation of the fourth aspect, the determining module is specifically configured to: when the quantity of concurrent users of the cell in the unit time is greater than the quantity of equivalent channels of the cell, the unsatisfied traffic volume of the cell in the unit time=the quantity of concurrent users of the cell in the unit time, and the satisfied traffic volume of the cell in the unit time=0; or when the quantity of concurrent users of the cell in the unit time is less than or equal to the quantity of equivalent channels of the cell, the unsatisfied traffic volume of the cell in the unit time=0, and the satisfied traffic volume of the cell in the unit time=the quantity of concurrent users of the cell in the unit time; or when the quantity of concurrent users of the cell in the unit time is greater than the quantity of equivalent channels of the cell, the satisfied traffic volume of the cell in the unit time=the quantity of concurrent users of the cell in the unit time*an actual single-user rate/a required single-user rate, and the unsatisfied traffic volume of the cell in the unit time=the quantity of concurrent users of the cell in the unit time*(1−the actual single-user rate/the required single-user rate); or when the quantity of concurrent users of the cell in the unit time is less than or equal to the quantity of equivalent channels of the cell, the unsatisfied traffic volume of the cell in the unit time=0, and the satisfied traffic volume of the cell in the unit time=the quantity of concurrent users of the cell in the unit time.

With reference to the fourth aspect or the first and the second possible implementations of the fourth aspect, in a third possible implementation of the fourth aspect, the adjustment module is specifically configured to: determine whether the experience blocking ratio is greater than a preset target experience blocking ratio; when the experience blocking ratio is greater than the target experience blocking ratio, query a blocking ratio table based on the target experience blocking ratio, to obtain a quantity of equivalent channels that is of the cell and that corresponds to the target experience blocking ratio, where the blocking ratio table includes a correspondence between a quantity of equivalent channels of the cell, an experience blocking ratio, and a traffic volume; and adjust the quantity of equivalent channels of the cell to the quantity of equivalent channels that is of the cell and that corresponds to the target experience blocking ratio.

A fifth aspect of the embodiments of the present application provides a network device, including: an obtaining module, configured to obtain a traffic volume statistical result of a cell in a statistics period; a first determining module, configured to determine a traffic volume distribution model of the cell in the statistics period and a parameter of the traffic volume distribution model based on the statistical result; a second determining module, configured to determine an experience blocking ratio of the cell based on a quantity of equivalent channels of the cell, the traffic volume distribution model, and the parameter of the traffic volume distribution model; and an adjustment module, configured to adjust the quantity of equivalent channels of the cell based on the experience blocking ratio.

With reference to the fifth aspect, in a first possible implementation of the fifth aspect, the second determining module is specifically configured to: determine a used blocking ratio table based on the parameter corresponding to the traffic volume distribution model; and query the blocking ratio table based on the quantity of equivalent channels of the cell and the traffic volume distribution model, to obtain the experience blocking ratio of the cell, where the blocking ratio table includes a correspondence between a quantity of equivalent channels of the cell, a traffic volume, a traffic volume distribution model, and an experience blocking ratio.

With reference to the fifth aspect, in a second possible implementation of the fifth aspect, the second determining module is specifically configured to: determine, based on the traffic volume distribution model, a blocking ratio calculation formula corresponding to the traffic volume distribution model; and substitute the parameter corresponding to the traffic volume distribution model and the quantity of equivalent channels of the cell into the blocking ratio calculation formula corresponding to the traffic volume distribution model, to obtain the experience blocking ratio of the cell.

With reference to the fifth aspect or the first and the second possible implementations of the fifth aspect, in a third possible implementation of the fifth aspect, the adjustment module is specifically configured to: determine whether the experience blocking ratio is greater than a preset target experience blocking ratio; when the experience blocking ratio is greater than the target experience blocking ratio, query the blocking ratio table based on the target experience blocking ratio, to obtain a quantity of equivalent channels that is of the cell and that corresponds to the target experience blocking ratio; and adjust the quantity of equivalent channels of the cell to the quantity of equivalent channels that is of the cell and that corresponds to the target experience blocking ratio.

With reference to the fifth aspect or the first to the third possible implementations of the fifth aspect, in a fourth possible implementation of the fifth aspect, the experience blocking ratio includes a hard experience blocking ratio and/or a soft experience blocking ratio.

With reference to the fifth aspect or the first to the fourth possible implementations of the fifth aspect, in a fifth possible implementation of the fifth aspect, the obtaining module is specifically configured to: deliver configuration information of a traffic volume detection parameter of the cell to a traffic volume detection device, where the configuration information includes identification information of the cell, the statistics period, and the unit time for statistics; and receive the statistical result from the traffic volume statistics device.

A sixth aspect of the embodiments of the present application provides a network device, including: an obtaining module, configured to obtain a data volume of a session in a cell in a statistics period and a delay of the session; a calculation module, configured to calculate an actual experience rate of the session based on the data volume of the session and the delay of the session, where the calculation module is further configured to calculate a blocking ratio of the session based on the actual experience rate of the session and a preset required single-user experience rate; and the calculation module is further configured to calculate an experience blocking ratio of the cell based on the experience blocking ratios of the session; and an adjustment module, configured to adjust a quantity of equivalent channels of the cell based on the experience blocking ratios of the cells.

With reference to the sixth aspect, in a first possible implementation of the sixth aspect, the calculation module is specifically configured to: when the actual experience rate of the session is greater than or equal to the required single-user experience rate, the blocking ratio of the session is 0; or when the actual experience rate of the session is less than the required single-user experience rate, the blocking ratio of the session is 1.

With reference to the sixth aspect, in a second possible implementation of the sixth aspect, the calculation module is specifically configured to: when the actual experience rate of the session is greater than or equal to the required single-user experience rate, the blocking ratio of the session is 0; or when the actual experience rate of the session is less than the required single-user experience rate, the blocking ratio of the session is $HL[i]=1-ET[i]/\theta$, where $ET[i]$ represents the actual experience rate of the session, and $\theta$ represents the required single-user experience rate.

With reference to the sixth aspect or the first and the second possible implementations of the sixth aspect, in a third possible implementation of the sixth aspect, the calculation module is specifically configured to: determine whether the experience blocking ratio of the cell is greater than a preset target experience blocking ratio; when the experience blocking ratio of the cell is greater than the target experience blocking ratio, query a blocking ratio table based on the target experience blocking ratio, to obtain a quantity of equivalent channels that is of the cell and that corresponds to the target experience blocking ratio, where the blocking ratio table includes a correspondence between a quantity of equivalent channels of the cell, a traffic volume, and an experience blocking ratio; and adjust the quantity of equivalent channels of the cell to the quantity of equivalent channels that is of the cell and that corresponds to the target experience blocking ratio.

With reference to the sixth aspect or the first to the third possible implementations of the sixth aspect, in a fourth possible implementation of the sixth aspect, the data volume of the session is obtained by subtracting a volume of data transmitted in the last transmission time unit from a total volume of successfully transmitted data, and the delay of the call is obtained by subtracting the last transmission time unit from a sum of a wait delay and a scheduling delay.

A seventh aspect of the embodiments of the present application provides a network device, including a memory and a processor, where the memory is configured to store a program instruction, and the processor is configured to invoke the program instruction in the memory to perform the following method: obtaining a quantity of concurrent users of a cell in a unit time in a statistics period; determining an experience blocking ratio of the cell in the statistics period based on the quantity of concurrent users of the cell in the unit time and a quantity of equivalent channels of the cell; and adjusting the quantity of equivalent channels of the cell based on the experience blocking ratio.

With reference to the seventh aspect, in a first possible implementation of the seventh aspect, the processor is specifically configured to: calculate an unsatisfied traffic volume and a satisfied traffic volume of the cell in the unit time; calculate an unsatisfied traffic volume and a satisfied traffic volume of the cell in the statistics period based on the unsatisfied traffic volume and the satisfied traffic volume of the cell in the unit time; and obtain the experience blocking ratio of the cell based on a ratio of the unsatisfied traffic volume of the cell in the statistics period to a total traffic volume.

With reference to the first possible implementation of the seventh aspect, in a second possible implementation of the seventh aspect, the processor is specifically configured to: when the quantity of concurrent users of the cell in the unit time is greater than the quantity of equivalent channels of the cell, the unsatisfied traffic volume of the cell in the unit time=the quantity of concurrent users of the cell in the unit time, and the satisfied traffic volume of the cell in the unit time=0; or when the quantity of concurrent users of the cell in the unit time is less than or equal to the quantity of equivalent channels of the cell, the unsatisfied traffic volume of the cell in the unit time=0, and the satisfied traffic volume of the cell in the unit time=the quantity of concurrent users of the cell in the unit time; or when the quantity of concurrent users of the cell in the unit time is greater than the quantity of equivalent channels of the cell, the satisfied traffic volume of the cell in the unit time=the quantity of concurrent users of the cell in the unit time*an actual single-user rate/a required single-user rate, and the unsatisfied traffic volume of the cell in the unit time=the quantity of concurrent users of the cell in the unit time*(1−the actual single-user rate/the required single-user rate); or when the quantity of concurrent users of the cell in the unit time is less than or equal to the quantity of equivalent channels of the cell, the unsatisfied traffic volume of the cell in the unit time=0, and the satisfied traffic volume of the cell in the unit time=the quantity of concurrent users of the cell in the unit time.

With reference to the seventh aspect or the first and the second possible implementations of the seventh aspect, in a third possible implementation of the seventh aspect, the processor is specifically configured to: determine whether the experience blocking ratio is greater than a preset target experience blocking ratio; when the experience blocking ratio is greater than the target experience blocking ratio, query a blocking ratio table based on the target experience blocking ratio, to obtain a quantity of equivalent channels that is of the cell and that corresponds to the target experience blocking ratio, where the blocking ratio table includes a correspondence between a quantity of equivalent channels of the cell, an experience blocking ratio, and a traffic volume; and adjust the quantity of equivalent channels of the cell to the quantity of equivalent channels that is of the cell and that corresponds to the target experience blocking ratio.

An eighth aspect of the embodiments of the present application provides a network device, including a memory and a processor, where the memory is configured to store a program instruction, and the processor is configured to invoke the program instruction in the memory to perform the following method: obtaining a traffic volume statistical result of a cell in a statistics period; determining a traffic volume distribution model of the cell in the statistics period and a parameter of the traffic volume distribution model based on the statistical result; determining an experience blocking ratio of the cell based on a quantity of equivalent channels of the cell, the traffic volume distribution model, and the parameter of the traffic volume distribution model; and adjusting the quantity of equivalent channels of the cell based on the experience blocking ratio.

With reference to the eighth aspect, in a first possible implementation of the eighth aspect, the processor is specifically configured to: determine a used blocking ratio table based on the parameter corresponding to the traffic volume distribution model; and query the blocking ratio table based on the quantity of equivalent channels of the cell and the traffic volume distribution model, to obtain the experience blocking ratio of the cell, where the blocking ratio table includes a correspondence between a quantity of equivalent channels of the cell, a traffic volume, a traffic volume distribution model, and an experience blocking ratio.

With reference to the eighth aspect, in a second possible implementation of the eighth aspect, the processor is specifically configured to: determine, based on the traffic volume distribution model, a blocking ratio calculation formula corresponding to the traffic volume distribution model; and substitute the parameter corresponding to the traffic volume distribution model and the quantity of equivalent channels of the cell into the blocking ratio calculation formula corresponding to the traffic volume distribution model, to obtain the experience blocking ratio of the cell.

With reference to the eighth aspect or the first and the second possible implementations of the eighth aspect, in a third possible implementation of the eighth aspect, the processor is specifically configured to: determine whether the experience blocking ratio is greater than a preset target experience blocking ratio; when the experience blocking ratio is greater than the target experience blocking ratio, query the blocking ratio table based on the target experience blocking ratio, to obtain a quantity of equivalent channels that is of the cell and that corresponds to the target experience blocking ratio, where the blocking ratio table includes the correspondence between the quantity of equivalent channels of the cell, the traffic volume, the traffic volume distribution model, and the experience blocking ratio; and adjust the quantity of equivalent channels of the cell to the quantity of equivalent channels that is of the cell and that corresponds to the target experience blocking ratio.

With reference to the eighth aspect or the first to the third possible implementations of the eighth aspect, in a fourth possible implementation of the eighth aspect, the experience blocking ratio includes a hard experience blocking ratio and/or a soft experience blocking ratio.

With reference to the eighth aspect or the first to the fourth possible implementations of the eighth aspect, in a fifth possible implementation of the eighth aspect, the processor is specifically configured to: deliver configuration information of a traffic volume detection parameter of the cell to a traffic volume detection device, where the configuration information includes identification information of the cell, the statistics period, and the unit time for statistics; and receive the statistical result from the traffic volume statistics device.

A ninth aspect of the embodiments of the present application provides a network device, including a memory and a processor, where the memory is configured to store a program instruction, and the processor is configured to invoke the program instruction in the memory to perform the following method: obtaining a data volume of a session in a cell in a statistics period and a delay of the session; calculating an actual experience rate of the session based on the data volume of the session and the delay of the session; calculating a blocking ratio of the session based on the actual experience rate of the session and a preset required single-user experience rate; calculating an experience blocking ratio of the cell based on the experience blocking ratios of the session; and adjusting a quantity of equivalent channels of the cell based on the experience blocking ratio of the cell.

With reference to the ninth aspect, in a first possible implementation of the ninth aspect, the processor is specifically configured to: when the actual experience rate of the session is greater than or equal to the required single-user experience rate, the blocking ratio of the session is 0; or when the actual experience rate of the session is less than the required single-user experience rate, the blocking ratio of the session is 1.

With reference to the ninth aspect, in a second possible implementation of the ninth aspect, the processor is specifically configured to: when the actual experience rate of the session is greater than or equal to the required single-user experience rate, the blocking ratio of the session is 0; or when the actual experience rate of the session is less than the required single-user experience rate, the blocking ratio of the session is $HL[i]=1-ET[i]/\theta$, where $ET[i]$ represents the actual experience rate of the session, and $\theta$ represents the required single-user experience rate.

With reference to the ninth aspect or the first and the second possible implementations of the ninth aspect, in a third possible implementation of the ninth aspect, the processor is specifically configured to: determine whether the experience blocking ratio of the cell is greater than a preset target experience blocking ratio; when the experience blocking ratio of the cell is greater than the target experience blocking ratio, query a blocking ratio table based on the target experience blocking ratio, to obtain a quantity of equivalent channels that is of the cell and that corresponds to the target experience blocking ratio, where the blocking ratio table includes a correspondence between a quantity of equivalent channels of the cell, a traffic volume, and an experience blocking ratio; and adjust the quantity of equivalent channels of the cell to the quantity of equivalent channels that is of the cell and that corresponds to the target experience blocking ratio.

With reference to the ninth aspect or the first to the third possible implementations of the ninth aspect, in a fourth possible implementation of the ninth aspect, the data volume of the session is obtained by subtracting a volume of data transmitted in the last transmission time unit from a total volume of successfully transmitted data, and the delay of the call is obtained by subtracting the last transmission time unit from a sum of a wait delay and a scheduling delay.

For beneficial effects of the network devices provided in the fourth aspect to the ninth aspect and the possible implementations of the fourth aspect to the ninth aspect, refer to beneficial effects in the first aspect to the third aspect and the possible implementations, and details are not described herein again.

According to the network capacity adjustment method and the network device provided in the embodiments of the present application, the network device determines the experience blocking ratio of the cell based on the quantity of concurrent users of the cell and the quantity of equivalent channels of the cell, or determines the experience blocking ratio of the cell based on the traffic volume distribution model in the cell, or determines the experience blocking ratio of the cell based on the actual experience rate of each session and the required single-user experience rate; and then adjusts the quantity of equivalent channels of the cell based on the experience blocking ratio of the cell. According to the method, the network capacity of the cell is adjusted based on the experience blocking ratio of the cell, so that the adjusted network capacity of the cell can satisfy the user experience.

DESCRIPTION OF EMBODIMENTS

Figure 1:
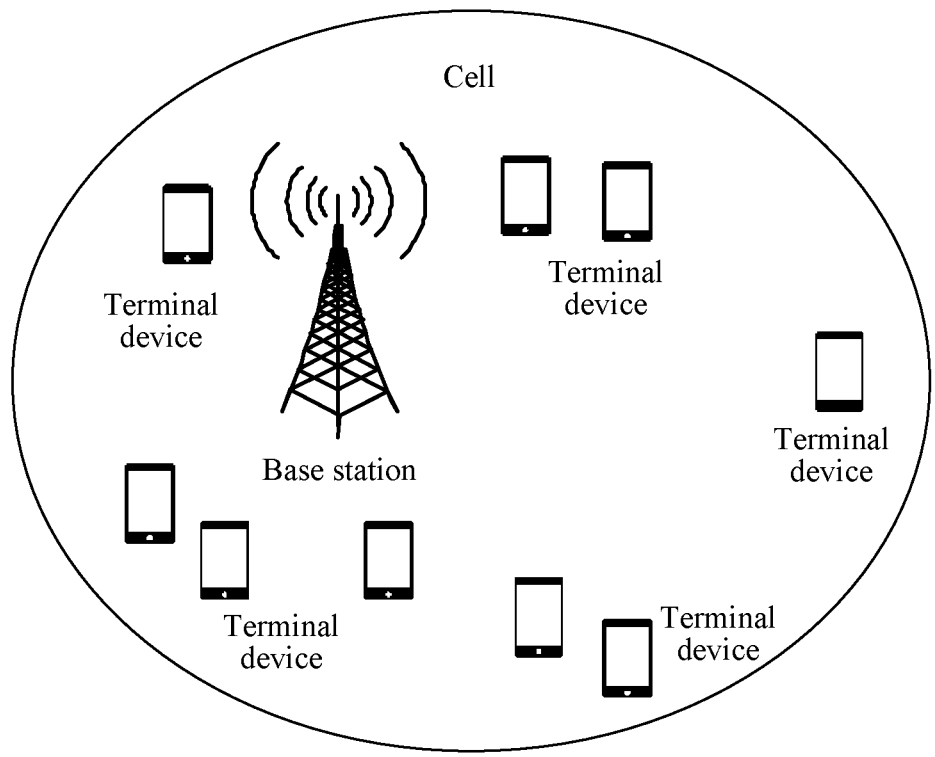
FIG. 1 is a schematic architectural diagram of a network system to which an embodiment of the present application is applicable.

An embodiment of the present application provides a network capacity adjustment method. The method may be applied to an existing network system. FIG. 1 is a schematic architectural diagram of a network system to which an embodiment of the present application is applicable. As shown in FIG. 1, the network system includes a base station, coverage of the base station forms a cell, and the cell serves a plurality of terminal devices. It should be noted that, the cell may further include a plurality of base stations, and coverage of each base station may also form a plurality of cells. The network system may be a global system for mobile communications (GSM) system, a code division multiple access (CDMA) system, a wideband code division multiple access (WCDMA) system, a long term evolution (LTE) system, or a 5th generation (5G) system. Correspondingly, the base station may be a base transceiver station (BTS) in the GSM system or the CDMA system, may be a NodeB (NB) in the WCDMA system, may be an evolved NodeB (eNB), an access point (AP), or a relay station in the LTE system, or may be a base station in the 5G system. This is not limited herein.

The terminal device may be a wireless terminal. The wireless terminal may be a device providing a voice and/or data service to a user, a handheld device having a wireless connection function, or another processing device connected to a wireless modem. The wireless terminal may communicate with at least one core network through a radio access network (RAN). The wireless terminal may be a mobile terminal, such as a mobile phone (also referred to as a "cellular" phone) or a computer with a mobile terminal, for example, may be a portable, pocket-sized, handheld, computer built-in, or in-vehicle mobile apparatus, which exchanges voice and/or data with the radio access network. The wireless terminal may also be referred to as a subscriber unit, a subscriber station, a mobile station, a mobile console, a remote station, an access point, a remote terminal, an access terminal, a user terminal, user equipment (UE), or a user agent. This is not limited herein.

Based on the foregoing architecture of the network system, technical solutions in this application and how to resolve the foregoing technical problem by using the technical solutions in this application are described in detail below by using specific embodiments. The following several specific embodiments may be mutually combined, and same or similar concepts or processes may not be repeatedly described in some embodiments.

Figure 2:
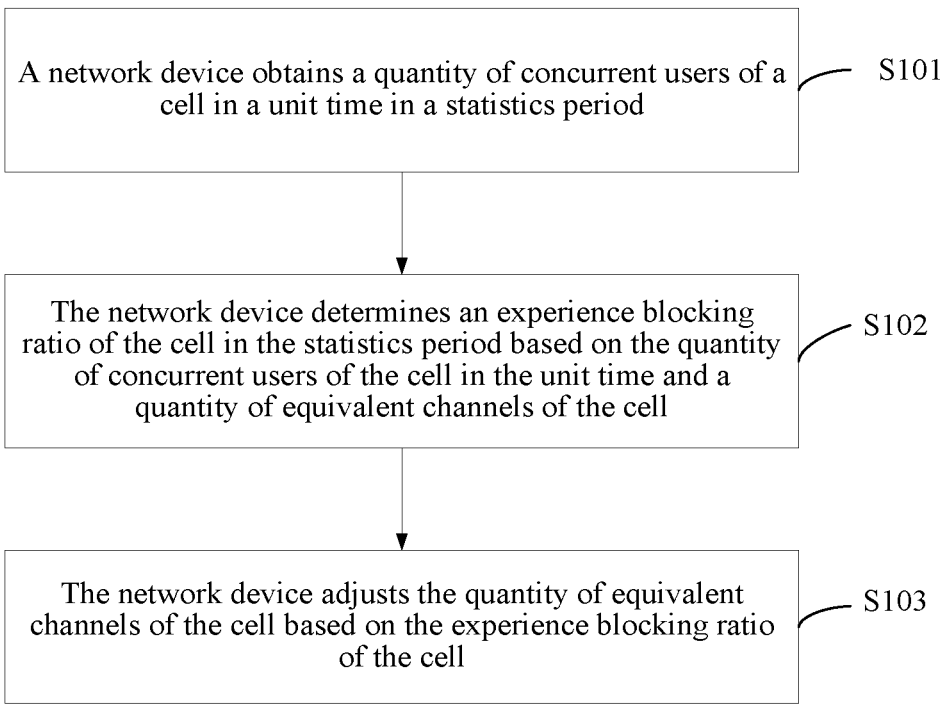
FIG. 2 is a flowchart of a network capacity adjustment method according to Embodiment 1 of the present application.

FIG. 2 is a flowchart of a network capacity adjustment method according to Embodiment 1 of the present application. As shown in FIG. 2, the method in this embodiment includes the following steps.

S101. A network device obtains a quantity of concurrent users of a cell in a unit time in a statistics period.

In this embodiment, the network device may be implemented by a device, for example, a base station, a controller, a gateway, or a network planning and optimization device, in an existing network system, or may be an independent device that is newly added. The network device may detect the quantity of concurrent users of the cell in the unit time in the statistics period; or may configure another device to detect the quantity of concurrent users of the cell, and then receive the quantity of concurrent users of the cell from the another device.

The statistics period may be from 8:00 in the morning to 6:00 in the afternoon every day, and the unit time for statistics may be every second, every minute, every ten minutes, every hour, or the like. In this embodiment, the network device obtains a quantity of concurrent users of the cell in each unit time in the statistics period.

It should be noted that, this embodiment is specific to a data network and a data service. The data service includes services such as a web page browsing service, a video service, an audio service, and a data download service. In the data network, a network capacity of the cell may be indicated by using a quantity of equivalent channels of the cell, and the quantity of equivalent channels of the cell may be obtained based on a ratio of a total transmission rate of the cell to a required single-user rate. The quantity of equivalent channels of the cell is a logical concept, and in an actual network, channels of the cell are not divided. The quantity of concurrent users of the cell is a quantity of users who can simultaneously transmit data at a same time. A difference from a voice network is that, in the data network, the quantity of concurrent users of the cell may be greater than the quantity of equivalent channels of the cell. This is because that in the data network, although a quantity of current users in the cell reaches a planned quantity of users, a new user can still access the data network for data transmission, but consequently, experience of all concurrent users is proportionally decreased. For example, for a video service, stalling occurs or video quality is reduced. For a file download or web browsing service, a download delay is increased.

S102. The network device determines an experience blocking ratio of the cell in the statistics period based on the quantity of concurrent users of the cell in the unit time and the quantity of equivalent channels of the cell.

In this embodiment, there are two manners of calculating the experience blocking ratio of the cell. The experience blocking ratio of the cell is classified into a hard experience blocking ratio and a soft experience blocking ratio based on different calculation manners. The hard experience blocking ratio means that when the network capacity of the cell (for example, the quantity of equivalent channels of the cell) is insufficient, experience of no concurrent user in the cell can be satisfied. The hard experience blocking ratio may indicate a ratio of erratic display of a video to a user datagram protocol (UDP)-based real-time video call process performed at a fixed bit rate. The soft experience blocking ratio of the cell means that when the network capacity of the cell is insufficient, experience of all concurrent users in the cell is partially satisfied. The soft experience blocking ratio may indicate a duration ratio of video stalling to a transmission control protocol (TCP)-based video transmission process. Both the hard experience blocking ratio and the soft experience blocking ratio of the cell are defined as a volume of all unsatisfied traffic/a total traffic volume in a statistics period [T1, T2]. A difference is that, when the hard experience blocking ratio and the soft experience blocking ratio of the cell are calculated, definitions of the unsatisfied traffic volume and a satisfied traffic volume are different. It should be noted that, the hard experience blocking ratio and the soft experience blocking ratio are merely used for distinguishing two blocking ratios, and may certainly alternatively be indicated by using other names, for example, a first blocking ratio and a second blocking ratio.

When the network device determines the hard experience blocking ratio of the cell, an unsatisfied traffic volume and a satisfied traffic volume of the cell in a unit time ti may be calculated by using the following method: (1) when the quantity of concurrent users of the cell in the unit time is greater than the quantity of equivalent channels of the cell, the unsatisfied traffic volume of the cell in the unit time=the quantity of concurrent users of the cell in the unit time, and the satisfied traffic volume of the cell in the unit time=0; or (2) when the quantity of concurrent users of the cell in the unit time is less than or equal to the quantity of equivalent channels of the cell, the unsatisfied traffic volume of the cell in the unit time=0, and the satisfied traffic volume of the cell in the unit time=the quantity of concurrent users of the cell in the unit time.

The network device calculates an unsatisfied traffic volume and a satisfied traffic volume of the cell in the statistics period based on the unsatisfied traffic volume and the satisfied traffic volume of the cell in the unit time. To be specific, the network device adds unsatisfied traffic volumes of the cell in all unit times in the statistics period to obtain the unsatisfied traffic volume of the cell in the statistics period, and adds satisfied traffic volumes in all the unit times in the statistics period to obtain the satisfied traffic volume of the cell in the statistics period. Then, the network device obtains the hard experience blocking ratio of the cell based on a ratio of the unsatisfied traffic volume of the cell in the statistics period to a total traffic volume. The total traffic volume may be obtained by using a sum of the unsatisfied traffic volume and the satisfied traffic volume of the cell in the statistics period. The total traffic volume obtained based on the unsatisfied traffic volume and the satisfied traffic volume of the cell is an actual total traffic volume of the cell. Alternatively, the total traffic volume may be converted by dividing a total data volume of traffic of the cell by a required single-user experience rate. The total traffic volume obtained based on the total data volume of the traffic of the cell and the required single-user experience rate is a required total traffic volume of the cell.

Table 1 shows a calculation example of the hard experience blocking ratio of the cell. As shown in Table 1:

TABLE 1

| | Unit time (second) | | | | | | | | | |
| --- | --- | --- | --- | --- | --- | --- | --- | --- | --- | --- |
| | 1 | 2 | 3 | 4 | 5 | 6 | 7 | 8 | 9 | 10 |
| Quantity of concurrent users of the cell | 10 | 9 | 8 | 7 | 12 | 15 | 16 | 7 | 8 | 9 |
| Satisfied traffic volume | 10 | 9 | 8 | 7 | 0 | 0 | 0 | 7 | 8 | 9 |
| Unsatisfied traffic volume | 0 | 0 | 0 | 0 | 12 | 15 | 16 | 0 | 0 | 0 |
| Hard experience blocking ratio of the cell | | | | | 0.43 | | | | | |

In the example shown in Table 1, the quantity of equivalent channels of the cell is 10, the unit time is every second, the satisfied traffic volume of the cell in the statistics period=10+9+8+7+7+8+9=58, the unsatisfied traffic volume of the cell in the statistics period=12+15+16=43, and the hard experience blocking ratio of the cell=43/(58+43)=0.43.

When the network device determines the soft experience blocking ratio of the cell, an unsatisfied traffic volume and a satisfied traffic volume of the cell in a unit time ti may be calculated by using the following method: (1) when the quantity of concurrent users of the cell in the unit time is greater than the quantity of equivalent channels of the cell, the satisfied traffic volume of the cell in the unit time=the quantity of concurrent users of the cell in the unit time*an actual single-user rate/the required single-user rate, and the unsatisfied traffic volume of the cell in the unit time=the quantity of concurrent users of the cell in the unit time*(1− the actual single-user rate/the required single-user rate); or (2) when the quantity of concurrent users of the cell in the unit time is less than or equal to the quantity of equivalent channels of the cell, the unsatisfied traffic volume of the cell in the unit time=0, and the satisfied traffic volume of the cell in the unit time=the quantity of concurrent users of the cell in the unit time.

Table 2 shows a calculation example of the soft experience blocking ratio of the cell. As shown in Table 2:

TABLE 2

| | Unit time (second) | | | | | | | | | |
|---|---|---|---|---|---|---|---|---|---|---|
| | 1 | 2 | 3 | 4 | 5 | 6 | 7 | 8 | 9 | 10 |
| Quantity of concurrent users of the cell | 10 | 9 | 8 | 7 | 12 | 15 | 16 | 7 | 8 | 9 |
| Satisfied traffic volume | 10 | 9 | 8 | 7 | 10 | 10 | 10 | 7 | 8 | 9 |
| Unsatisfied traffic volume | 0 | 0 | 0 | 0 | 2 | 5 | 6 | 0 | 0 | 0 |
| Soft experience blocking ratio of the cell | | | | | 0.13 | | | | | |

In the example shown in Table 2, the quantity of equivalent channels of the cell is 10, the unit time is every second, the satisfied traffic volume of the cell in the statistics period=10+9+8+7+10+10+10+7+8+9=88, the unsatisfied traffic volume of the cell in the statistics period=2+5+6=13, and the soft experience blocking ratio of the cell=13/(88+13)=0.13.

In this embodiment, the quantity of equivalent channels of the cell may be received by the network device from another device, or may be calculated by the network device. The network device may obtain average spectral efficiency and spectral bandwidth of the cell, obtain the total transmission rate C Mbps of the cell based on the average spectral efficiency and the spectral bandwidth, and then obtain the quantity N=[C/Q] of equivalent channels of the cell based on the required single-user rate Q Mbps.

S103. The network device adjusts the quantity of equivalent channels of the cell based on the experience blocking ratio of the cell.

Specifically, the network device may first determine whether the experience blocking ratio of the cell is greater than a preset target experience blocking ratio; when the experience blocking ratio of the cell is greater than the target experience blocking ratio, query a blocking ratio table based on the target experience blocking ratio, to obtain a quantity of equivalent channels that is of the cell and that corresponds to the target experience blocking ratio, where the blocking ratio table includes a correspondence between a quantity of channels of the cell, an experience blocking ratio, and a traffic volume; and adjusts the quantity of equivalent channels of the cell to the quantity of equivalent channels that is of the cell and that corresponds to the target experience blocking ratio. The quantity of equivalent channels of the cell needs to be adjusted based on the experience blocking ratio of the cell on the premise of a same traffic volume, in other words, the unadjusted quantity of equivalent channels and an adjusted quantity of equivalent channels of the cell are specific to a same traffic volume. The blocking ratio table may be pre-defined by an operator and loaded to the network device.

It should be noted that, in this embodiment, the experience blocking ratio of the cell may include only the hard experience blocking ratio or the soft experience blocking ratio, or may include the hard experience blocking ratio and the soft experience blocking ratio. Correspondingly, when the quantity of equivalent channels of the cell is adjusted, the quantity of equivalent channels may be adjusted based only on the hard experience blocking ratio of the cell, may be adjusted based only on the soft experience blocking ratio of the cell, or may be adjusted based on the hard experience blocking ratio and the soft experience blocking ratio of the cell.

Specifically, when performing the adjustment based on the hard experience blocking ratio of the cell, the network device first determines whether the hard experience blocking ratio of the cell is greater than a preset target hard experience blocking ratio. The target hard experience blocking ratio may be set by the operator, target hard experience blocking ratios set by different operators may be different, and target hard experience blocking ratios of different network systems may also be different. When the hard experience blocking ratio of the cell is greater than the target hard experience blocking ratio, the network device queries a blocking ratio table based on the target hard soft experience blocking ratio, to obtain a quantity of equivalent channels that is of the cell and that corresponds to the target hard experience blocking ratio. The blocking ratio table includes a correspondence between a quantity of channels of the cell and a hard experience blocking ratio. Then, the network device adjusts the quantity of equivalent channels of the cell to the quantity of equivalent channels that is of the cell and that corresponds to the target hard experience blocking ratio. When the hard experience blocking ratio of the cell is less than or equal to the target hard experience blocking ratio, the quantity of equivalent channels of the cell may not be adjusted, or may be similarly adjusted by querying the table.

When performing the adjustment based on the soft experience blocking ratio of the cell, the network device first determines whether the soft experience blocking ratio of the cell is greater than a preset target soft experience blocking ratio, and when the soft experience blocking ratio of the cell is greater than the target soft experience blocking ratio, queries a blocking ratio table based on the target soft experience blocking ratio, to obtain a quantity of equivalent channels that is of the cell and that corresponds to the target soft experience blocking ratio. The blocking ratio table includes a correspondence between a quantity of channels of the cell, a soft experience blocking ratio, and a traffic volume. Then, the network device adjusts the quantity of equivalent channels of the cell to the quantity of equivalent channels that is of the cell and that corresponds to the target soft experience blocking ratio. When the soft experience blocking ratio of the cell is less than or equal to the target soft experience blocking ratio, the quantity of equivalent channels of the cell may not be adjusted, or may be similarly adjusted by querying the table.

When performing the adjustment based on the hard experience blocking ratio and the soft experience blocking ratio of the cell, the network device separately determines whether the hard experience blocking ratio of the cell is greater than a preset target hard experience blocking ratio and whether the soft experience blocking ratio of the cell is greater than a preset target soft experience blocking ratio; and when the hard experience blocking ratio of the cell is greater than the target hard experience blocking ratio, or the soft experience blocking ratio of the cell is greater than the preset target soft experience blocking ratio, or the hard experience blocking ratio of the cell is greater than the target hard experience blocking ratio and the soft experience blocking ratio of the cell is greater than the preset target soft experience blocking ratio, the network device queries a blocking ratio table, to obtain a quantity of equivalent channels that is of the cell and that corresponds to the target soft experience blocking ratio and a quantity of equivalent channels that is of the cell and that corresponds to the target hard experience blocking ratio. If the quantity of equivalent channels that is of the cell and that corresponds to the target soft experience blocking ratio is the same as the quantity of equivalent channels that is of the cell and that corresponds to the target hard experience blocking ratio, the network device adjusts the quantity of equivalent channels of the cell to the same quantity of channels. If the quantity of equivalent channels that is of the cell and that corresponds to the target soft experience blocking ratio is different from the quantity of equivalent channels that is of the cell and that corresponds to the target hard experience blocking ratio, the network device may select any of the two quantities of equivalent channels as the adjusted quantity of equivalent channels of the cell, or may use an average value of the two quantities of equivalent channels as the adjusted quantity of equivalent channels of the cell.

The network device plans or optimizes the network capacity based on the adjusted quantity of equivalent channels of the cell. Alternatively, the network device may obtain a transmission rate of the cell based on the adjusted quantity of equivalent channels of the cell, where the transmission rate of the cell=adjusted channels of the cell*the required single-user rate; and further plan or optimize the network capacity based on the transmission rate of the cell. Alternatively, the network device may send the adjusted quantity of equivalent channels of the cell to a network planning and optimization device, and the network planning and optimization device plans or optimizes the network capacity of the cell.

According to the method in this embodiment, the network device obtains the quantity of concurrent users of the cell in the unit time in the statistics period, determines the experience blocking ratio of the cell in the statistics period based on the quantity of concurrent users of the cell in the unit time and the quantity of equivalent channels of the cell, and adjusts the quantity of equivalent channels of the cell based on the experience blocking ratio of the cell. According to the method, when the network capacity of the cell is adjusted, the experience blocking ratio of the cell is determined based on the quantity of concurrent users of the cell, and then the network capacity of the cell is adjusted based on the experience blocking ratio of the cell, so that an adjusted network capacity of the cell can satisfy user experience.

Figure 3:
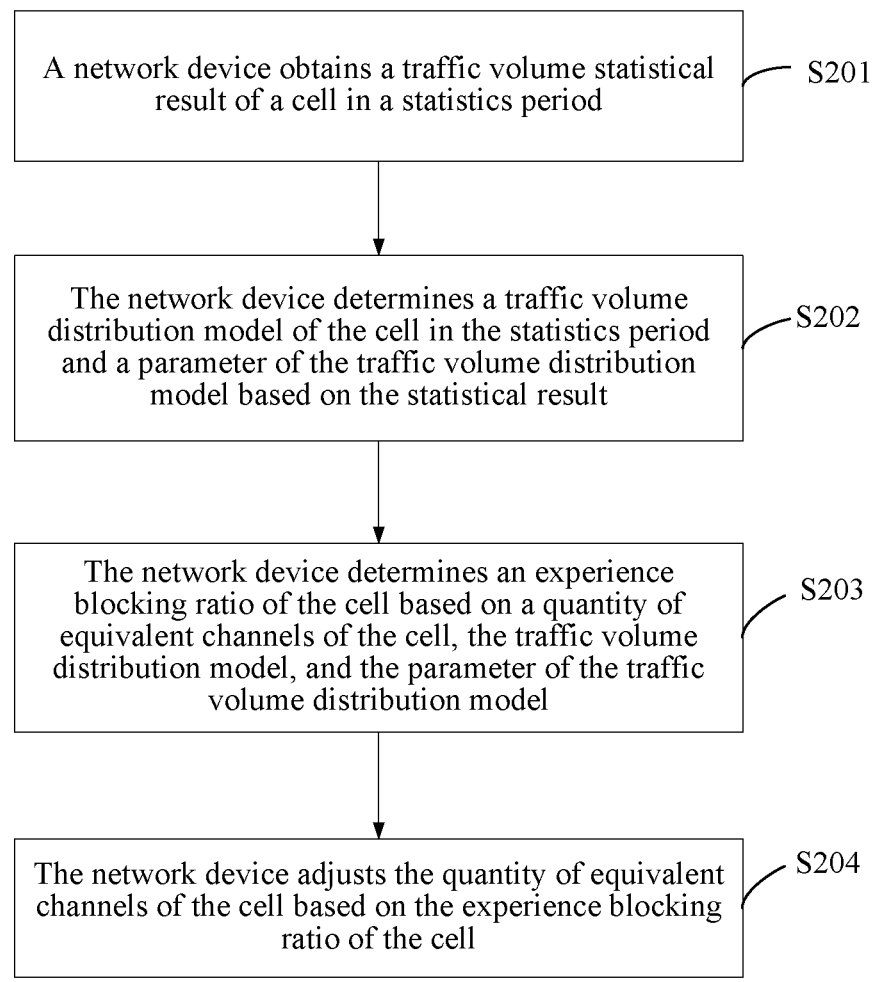
FIG. 3 is a flowchart of a network capacity adjustment method according to Embodiment 2 of the present application.

FIG. 3 is a flowchart of a network capacity adjustment method according to Embodiment 2 of the present application. Different from the method in Embodiment 1, in this embodiment, an experience blocking ratio of a cell is mainly determined based on a traffic volume distribution model in the cell. As shown in FIG. 3, the method in this embodiment includes the following steps.

S201. A network device obtains a traffic volume statistical result of the cell in a statistics period.

The statistics period includes a plurality of unit times, and there may be a plurality of sessions in each unit time. Therefore, the statistical result obtained by the network device includes duration of each session in each unit time in the statistics period, and further includes at least one of a quantity of session arrival times and a session time interval in the unit time. The quantity of session arrival times and the session time interval in the unit time can be converted from each other, to be specific, if any one of the quantity of session arrival times and the session time interval is known, the other one may be obtained. Optionally, the statistical result may further include a data volume of each session in the unit time. The session time interval is an interval between start time points of two neighboring sessions, and the duration of the session is a channel occupation time of the session. The network device may be a base station, a controller, a gateway, a network planning and optimization device, or the like.

When the network device is a base station, a controller, or a gateway, the network device may detect a traffic volume of the cell to obtain the statistical result. When the network device is a network planning and optimization device, the network device delivers configuration information of a traffic volume detection parameter of the cell to a traffic volume detection device. The configuration information is used to indicate parameters to be detected by the traffic volume detection device, and the traffic volume detection device may be a base station, a controller, a gateway, or the like. The configuration information specifically includes identification information of the cell, the statistics period, and the unit time for statistics. The identification information of the cell is used to indicate a cell whose traffic volume is to be detected by the traffic volume detection device, and the identification information of the cell may be specifically area or location information of the cell, an address of the base station, an identifier of the cell, or the like, provided that the identification information of the cell can uniquely identify one cell. Optionally, the configuration information of the traffic volume detection parameter may further include a session traffic threshold, and the session traffic threshold is used to instruct the traffic volume detection device not to collect and report a session whose session data volume is less than the session traffic threshold, and to collect and report only a session whose session data volume is greater than or equal to the session traffic threshold. Table 3 shows an example of the configuration information of the traffic volume detection parameter:

TABLE 3

| Traffic volume detection parameter | Parameter value |
| --- | --- |
| Statistics period | From 8:00 in the morning to 6:00 in the afternoon |
| Unit time | Every second, every minute, or every hour |
| Session traffic threshold | 1 kb |
| Identification information of a cell for which statistics is to be collected | Area or a location |

The traffic volume detection device performs traffic volume detection based on the configuration information, and reports the obtained traffic volume statistical result to a network capacity adjustment device.

S202. The network device determines the traffic volume distribution model of the cell in the statistics period and a parameter of the traffic volume distribution model based on the statistical result.

The network device performs model abstraction and parameter fitting based on the statistical result to obtain the traffic volume distribution model and the parameter of the traffic volume distribution model. The traffic volume distribution model may be a Poisson distribution model, a power-law distribution model, or the like. Different traffic volume distribution models have different parameters. Parameters of the Poisson distribution model are an average quantity λ of session arrival times and average session duration μ, and a parameter of the power-law distribution model is a power exponent. For the Poisson distribution model, a quantity of session arrival times in the statistics period may be fitted to obtain the Poisson distribution model and the parameter λ (the average quantity of session arrival times in the statistics period) of the Poisson distribution model; and session duration is fitted to obtain an exponential distribution model and the parameter μ of the exponential distribution model.

Step 203. The network device determines the experience blocking ratio of the cell based on a quantity of equivalent channels of the cell, the traffic volume distribution model, and the parameter of the traffic volume distribution model.

In an implementation, the network device first determines, based on the traffic volume distribution model, a blocking ratio calculation formula corresponding to the traffic volume distribution model. Different traffic volume distribution models correspond to different blocking ratio calculation formulas. Then, the network device substitutes the parameter corresponding to the traffic volume distribution model and the quantity of equivalent channels of the cell into a hard blocking ratio calculation formula corresponding to the traffic volume distribution model, to obtain the experience blocking ratio of the cell. The blocking ratio calculation formula corresponding to the traffic volume distribution model is related to a specific implementation, and different operators may use different blocking ratio calculation formulas. The blocking ratio calculation formula is not limited in this embodiment of the present application.

In addition, in this embodiment, the experience blocking ratio of the cell may also include a hard experience blocking ratio and/or a soft experience blocking ratio. The hard experience blocking ratio of the cell means that when a network capacity of the cell is insufficient, experience of no concurrent user in the cell can be satisfied. The soft experience blocking ratio of the cell means that when the network capacity of the cell is insufficient, experience of all concurrent users in the cell is partially satisfied. A hard experience blocking ratio calculation formula and a soft experience blocking ratio calculation formula that correspond to a same traffic volume distribution model are different. The following formula is a hard experience blocking ratio formula corresponding to the Poisson distribution model:

$$p_{Lost\_H} = \frac{\sum_{i=N+1}^{M} i \frac{1}{N^{i-N}N!}(A)^i \frac{1}{1 + \sum_{i=1}^{N} \frac{1}{i!}A^i + \sum_{i=N+1}^{M} \frac{1}{N^{i-N}N!}A^i}}{\sum_{i=0}^{M} i\pi_i}$$

A is the traffic volume, A=λμ, λ is the average quantity of session arrival times in the statistics period, μ is the average session duration in the statistics period, π is a probability that the quantity of concurrent users is i when a system reaches a stable state, N is the quantity of equivalent channels of the cell, and M is a maximum quantity of concurrent users of the cell. M may be pre-defined by an operator of the cell.

In another implementation, the network device queries a blocking ratio table to obtain the experience blocking ratio of the cell. Specifically, the network device first determines a used blocking ratio table based on the parameter corresponding to the traffic volume distribution model. For example, if a call arrival process is in Poisson distribution, an average quantity of arrival times in the unit time is λ=0.25 time/second, service duration is in exponential distribution, and average duration is μ=50 seconds, the traffic volume A=λ*μ=12.5 Erlang, and correspondingly, a blocking ratio table in which a traffic volume is 12.5 Erlang is selected. Then, the network device queries the blocking ratio table based on the quantity of equivalent channels of the cell and the traffic volume distribution model, to obtain the experience blocking ratio of the cell. The blocking ratio table includes a correspondence between a quantity of equivalent channels of the cell, a traffic volume, a traffic volume distribution model, and an experience blocking ratio.

Table 4 is a table of comparison between a blocking ratio in the prior art and a blocking ratio in the present application when a traffic volume is 12.5 Erlang:

TABLE 4

| Quantity of equivalent channels of the cell (where a traffic volume is 12.5 Erlang) | Erlang B (Poisson distribution) | Hard experience blocking ratio (Poisson distribution) | Soft experience blocking ratio (Poisson distribution) | Hard experience blocking ratio (Power-law distribution) | Soft experience blocking ratio (Power-law distribution) |
|---|---|---|---|---|---|
| 15 | 10% | 52% | 15% | 64% | 20% |
| 16 | 8% | 35% | 8% | 46% | 11% |
| 17 | 5% | 22% | 4% | 31% | 6% |
| 18 | 4% | 14% | 2% | 21% | 4% |
| 19 | 2% | 8% | 1% | 12% | 2% |
| 20 | 1% | 5% | 1% | 7% | 1% |

The second column in Table 4 indicates a blocking ratio calculated based on an existing Erlang B, and a table obtained by removing the second column from Table 4 is the blocking ratio table used in this embodiment of the present application. The blocking ratio table may be pre-obtained by the operator through massive data measurement and simulation. It should be understood that, the blocking ratio table shown in Table 4 is merely a possible implementation. Alternatively, the blocking ratio table may include only the hard experience blocking ratio or the soft experience blocking ratio, may include only a blocking ratio corresponding to the Poisson distribution, or may include only a blocking ratio corresponding to the power-law distribution. Certainly, the quantity of equivalent channels of the cell is also only an example for description, and a larger or smaller quantity of equivalent channels may further be included.

S204. The network device adjusts the quantity of equivalent channels of the cell based on the experience blocking ratio of the cell.

Specifically, the network device determines whether the experience blocking ratio is greater than a preset target experience blocking ratio. When the experience blocking ratio is greater than the target experience blocking ratio, the network device queries the blocking ratio table based on the target experience blocking ratio, to obtain a quantity of equivalent channels that is of the cell and that corresponds to the target experience blocking ratio. The blocking ratio table includes a correspondence between a quantity of equivalent channels of the cell, a traffic volume, a traffic volume distribution model, and an experience blocking ratio. The network device adjusts the quantity of equivalent channels of the cell to the quantity of equivalent channels that is of the cell and that corresponds to the target experience blocking ratio. In this embodiment, the experience blocking ratio of the cell may also include a hard experience blocking ratio and/or a soft experience blocking ratio. For a specific implementation of this step, refer to the specific implementation of step 103 in Embodiment 1, and details are not described herein again. A difference is that, the blocking ratio table in this embodiment further includes the traffic volume distribution model.

According to the method in this embodiment, the network device obtains the traffic volume statistical result in the unit time in the statistics period, determines the traffic volume distribution model of the cell in the statistics period and the parameter of the traffic volume distribution model based on the statistical result, determines the experience blocking ratio of the cell based on the quantity of equivalent channels of the cell, the traffic volume distribution model, and the parameter of the traffic volume distribution model, and adjusts the quantity of equivalent channels of the cell based on the experience blocking ratio of the cell. According to the method, the experience blocking ratio of the cell is determined based on the traffic volume distribution model in the cell, and then the network capacity of the cell is adjusted based on the experience blocking ratio of the cell, so that an adjusted network capacity of the cell can satisfy user experience.

Figure 4:
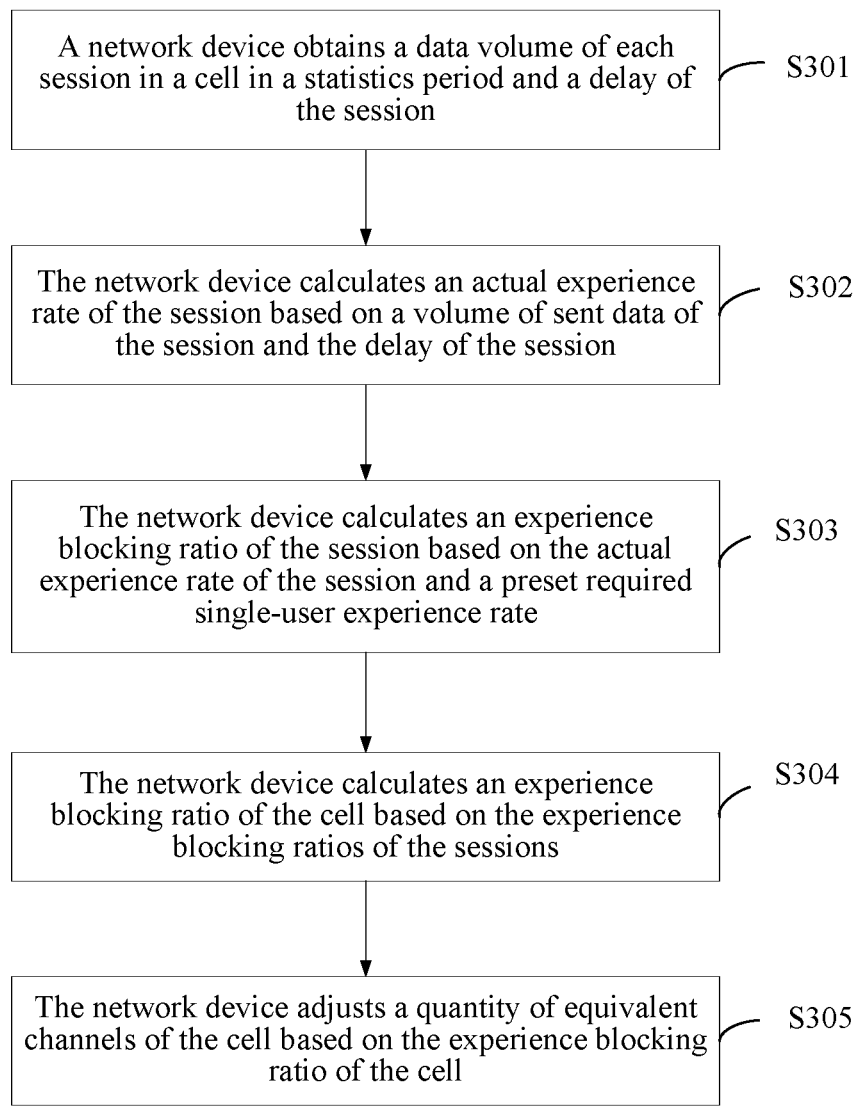
FIG. 4 is a flowchart of a network capacity adjustment method according to Embodiment 3 of the present application.

FIG. 4 is a flowchart of a network capacity adjustment method according to Embodiment 3 of the present application. Different from the methods in Embodiment 1 and Embodiment 2, according to the method in this embodiment, an experience blocking ratio of a cell is mainly determined based on an actual experience rate of each session and a required single-user experience rate. As shown in FIG. 4, the method in this embodiment includes the following steps.

S301. A network device obtains a data volume of a session in the cell in a statistics period and a delay of the session.

There are a plurality of sessions in the statistics period, and the network device obtains a quantity of each session and the delay of each session. The data volume of the session may be obtained by subtracting a volume of data transmitted in the last transmission time unit from a total volume of transmitted data, and the delay of the session is obtained by subtracting the last transmission time unit from a sum of a wait delay and a scheduling delay. The transmission time unit is a minimum length for data transmission. In an LTE system, a minimum transmission time unit is a transmission time interval (TTI). As a network system evolves, a value of the transmission time unit may change.

S302. The network device calculates the actual experience rate of the session based on a volume of sent data of the session and the delay of the session.

An actual experience rate $ET[i]$ of an $i^{th}$ session=Traffics$[i]*8/$Delay$[i]/1000$, where Traffics$[i]$ is a data volume of the $i^{th}$ session, Delay$[i]$ is a delay of the $i^{th}$ session, and a unit of the actual experience rate $ET[i]$ is Mbps.

S303. The network device calculates an experience blocking ratio of the session based on the actual experience rate of the session and a preset required single-user experience rate.

Specifically, assuming that an actual experience rate of an $i^{th}$ call is $ET[i]$, and the required single-user experience rate is $\theta$, a blocking ratio of the $i^{th}$ session may be calculated by using the following two manners:

(1) When $ET[i] \geq \theta$, the blocking ratio of the $i^{th}$ session is equal to 0; or when $ET[i] < \theta$, the blocking ratio of the $i^{th}$ session is 1.

(2) When $ET[i] \geq \theta$, the blocking ratio of the $i^{th}$ session is equal to 0; or when $ET[i] < \theta$, the blocking ratio of the $i^{th}$ session is $1-ET[i]/\theta$.

An experience blocking ratio calculated in the manner (1) is also referred to as a hard experience blocking ratio of the session, and an experience blocking ratio calculated in the manner (2) is also referred to as a soft experience blocking ratio of the session.

S304. The network device calculates the experience blocking ratio of the cell based on the experience blocking ratios of the session.

There are the plurality of sessions in the cell in the statistics period, and the experience blocking ratio of the cell may be an average value of a sum of the experience blocking ratios of all the sessions in the cell. The experience blocking ratio of the cell herein may also include a hard experience blocking ratio and/or a soft experience blocking ratio. The hard experience blocking ratio of the cell in this embodiment means that when a network capacity of the cell is insufficient, experience of no concurrent user in the cell can be satisfied. The soft experience blocking ratio of the cell means that when the network capacity of the cell is insufficient, experience of all concurrent users in the cell is partially satisfied. Assuming that a quantity of sessions in the cell is $\Omega$, the hard experience blocking ratio of the cell is represented as HL_AVG, and the soft experience blocking ratio of the cell is represented as SL_AVG, HL_AVG=$\Sigma_{i\in\Omega}$HL$[i]/|\Omega|$, where HL$[i]$ is a hard experience blocking ratio of the $i^{th}$ session; and SL_AVG=$\Sigma_{i\in\Omega}$SL$[i]/|\Omega|$, where SL$[i]$ is a soft experience blocking ratio of the $i^{th}$ session.

S305. The network device adjusts a quantity of equivalent channels of the cell based on the experience blocking ratio of the cell.

For a specific implementation of this step, refer to the specific implementation of step 103 in Embodiment 1, and details are not described herein again.

According to the method in this embodiment, the network device obtains the data volume of a session in the cell in the statistics period and the delay of the session, calculates the actual experience rate of the session based on the data volume of the session and the delay of the session, calculates the blocking ratio of the session based on the actual experience rate of the session and the preset required single-user experience rate, calculates the experience blocking ratio of the cell based on the experience blocking ratios of all the sessions in the cell, and adjusts the quantity of equivalent channels of the cell based on the experience blocking ratio of the cell. According to the method, the experience blocking ratio of the cell is determined based on the actual experience rate of each session in the cell and a single-user experience rate, and then the network capacity of the cell is adjusted based on the experience blocking ratio of the cell, so that an adjusted network capacity of the cell can satisfy user experience.

Figure 5:
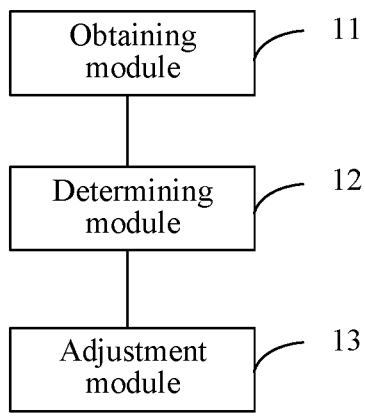
FIG. 5 is a schematic structural diagram of a network device according to Embodiment 4 of the present application.

FIG. 5 is a schematic structural diagram of a network device according to Embodiment 4 of the present application. As shown in FIG. 5, the network device includes: an obtaining module 11, configured to obtain a quantity of concurrent users of a cell in a unit time in a statistics period; a determining module 12, configured to determine an experience blocking ratio of the cell in the statistics period based on the quantity of concurrent users of the cell in the unit time and a quantity of equivalent channels of the cell; and an adjustment module 13, configured to adjust the quantity of equivalent channels of the cell based on the experience blocking ratio.

Optionally, the determining module 12 is specifically configured to: calculate an unsatisfied traffic volume and a satisfied traffic volume of the cell in the unit time; calculate an unsatisfied traffic volume and a satisfied traffic volume of the cell in the statistics period based on the unsatisfied traffic volume and the satisfied traffic volume of the cell in the unit time; and obtain the experience blocking ratio of the cell based on a ratio of the unsatisfied traffic volume of the cell in the statistics period to a total traffic volume.

Optionally, the determining module 12 is specifically configured to: when the quantity of concurrent users of the cell in the unit time is greater than the quantity of equivalent channels of the cell, the unsatisfied traffic volume of the cell in the unit time=the quantity of concurrent users of the cell in the unit time, and the satisfied traffic volume of the cell in the unit time=0; or when the quantity of concurrent users of the cell in the unit time is less than or equal to the quantity of equivalent channels of the cell, the unsatisfied traffic volume of the cell in the unit time=0, and the satisfied traffic volume of the cell in the unit time=the quantity of concurrent users of the cell in the unit time; or when the quantity of concurrent users of the cell in the unit time is greater than the quantity of equivalent channels of the cell, the satisfied traffic volume of the cell in the unit time=the quantity of concurrent users of the cell in the unit time*an actual single-user rate/a required single-user rate, and the unsatisfied traffic volume of the cell in the unit time=the quantity of concurrent users of the cell in the unit time*(1−the actual single-user rate/the required single-user rate); or when the quantity of concurrent users of the cell in the unit time is less than or equal to the quantity of equivalent channels of the cell, the unsatisfied traffic volume of the cell in the unit time=0, and the satisfied traffic volume of the cell in the unit time=the quantity of concurrent users of the cell in the unit time.

Optionally, the adjustment module 13 is specifically configured to: determine whether the experience blocking ratio is greater than a preset target experience blocking ratio; when the experience blocking ratio is greater than the target experience blocking ratio, query a blocking ratio table based on the target experience blocking ratio, to obtain a quantity of equivalent channels that is of the cell and that corresponds to the target experience blocking ratio, where the blocking ratio table includes a correspondence between a quantity of equivalent channels of the cell, an experience blocking ratio, and a traffic volume; and then adjust the quantity of equivalent channels of the cell to the quantity of equivalent channels that is of the cell and that corresponds to the target experience blocking ratio.

The network device provided in this embodiment may be configured to perform the method in Embodiment 1. A specific implementation principle and technical effects are similar to those of the method in Embodiment 1, and details are not described herein again.

Figure 6:
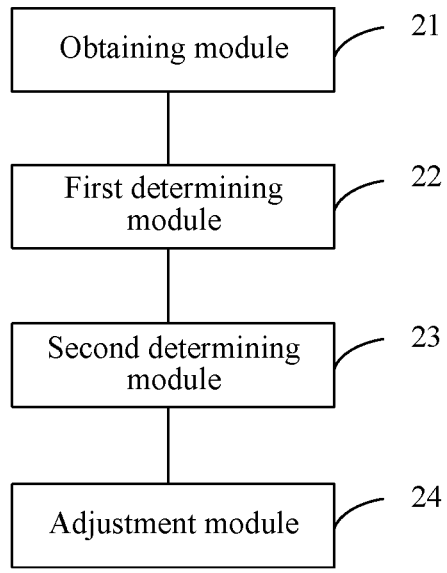
FIG. 6 is a schematic structural diagram of a network device according to Embodiment 5 of the present application.

FIG. 6 is a schematic structural diagram of a network device according to Embodiment 5 of the present application. As shown in FIG. 6, the network device includes: an obtaining module 21, configured to obtain a traffic volume statistical result of a cell in a statistics period; a first determining module 22, configured to determine a traffic volume distribution model of the cell in the statistics period and a parameter of the traffic volume distribution model based on the statistical result; a second determining module 23, configured to determine an experience blocking ratio of the cell based on a quantity of equivalent channels of the cell, the traffic volume distribution model, and the parameter of the traffic volume distribution model; and an adjustment module 24, configured to adjust the quantity of equivalent channels of the cell based on the experience blocking ratio.

Optionally, the second determining module 23 is specifically configured to: determine a used blocking ratio table based on the parameter corresponding to the traffic volume distribution model; and query the blocking ratio table based on the quantity of equivalent channels of the cell and the traffic volume distribution model, to obtain the experience blocking ratio of the cell, where the blocking ratio table includes a correspondence between a quantity of equivalent channels of the cell, a traffic volume, a traffic volume distribution model, and an experience blocking ratio.

Optionally, the second determining module 23 is specifically configured to: determine, based on the traffic volume distribution model, a blocking ratio calculation formula corresponding to the traffic volume distribution model; and substitute the parameter corresponding to the traffic volume distribution model and the quantity of equivalent channels of the cell into the blocking ratio calculation formula corresponding to the traffic volume distribution model, to obtain the experience blocking ratio of the cell.

Optionally, the adjustment module 24 is specifically configured to: determine whether the experience blocking ratio is greater than a preset target experience blocking ratio; when the experience blocking ratio is greater than the target experience blocking ratio, query the blocking ratio table based on the target experience blocking ratio, to obtain a quantity of equivalent channels that is of the cell and that corresponds to the target experience blocking ratio; and adjust the quantity of equivalent channels of the cell to the quantity of equivalent channels that is of the cell and that corresponds to the target experience blocking ratio, where the blocking ratio table includes the correspondence between the quantity of equivalent channels of the cell, the traffic volume, the traffic volume distribution model, and the experience blocking ratio.

Optionally, the experience blocking ratio includes a hard experience blocking ratio and/or a soft experience blocking ratio.

Optionally, the obtaining module 21 is specifically configured to: deliver configuration information of a traffic volume detection parameter of the cell to a traffic volume detection device, where the configuration information includes identification information of the cell, the statistics period, and the unit time for statistics; and receive the statistical result from the traffic volume statistics device.

The network device provided in this embodiment may be configured to perform the method in Embodiment 2. A specific implementation principle and technical effects are similar to those of the method in Embodiment 2, and details are not described herein again.

Figure 7:
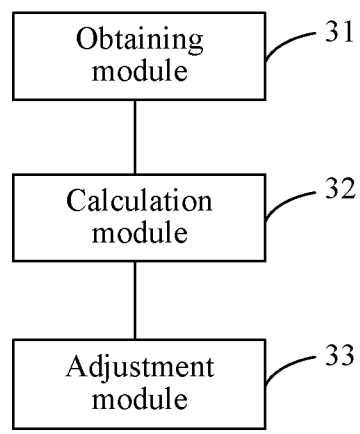
FIG. 7 is a schematic structural diagram of a network device according to Embodiment 6 of the present application.

FIG. 7 is a schematic structural diagram of a network device according to Embodiment 6 of the present application. As shown in FIG. 7, the network device includes: an obtaining module 31, configured to obtain a data volume of a session in a cell in a statistics period and a delay of the session; a calculation module 32, configured to calculate an actual experience rate of the session based on the data volume of the session and the delay of the session, where the calculation module 32 is further configured to calculate a blocking ratio of the session based on the actual experience rate of the session and a preset required single-user experience rate; and the calculation module 32 is further configured to calculate an experience blocking ratio of the cell based on the experience blocking ratios of the session; and an adjustment module 33, configured to adjust a quantity of equivalent channels of the cell based on the experience blocking ratio of the cell.

Optionally, the calculation module 32 is specifically configured to: when the actual experience rate of the session is greater than or equal to the required single-user experience rate, the blocking ratio of the session is 0; or when the actual experience rate of the session is less than the required single-user experience rate, the blocking ratio of the session is 1.

Optionally, the calculation module 32 is specifically configured to: when the actual experience rate of the session is greater than or equal to the required single-user experience rate, the blocking ratio of the session is 0; or when the actual experience rate of the session is less than the required single-user experience rate, the blocking ratio of the session is $HL[i]=1-ET[i]/\theta$, where $ET[i]$ represents the actual experience rate of the session, and $\theta$ represents the required single-user experience rate.

Optionally, the adjustment module 33 is specifically configured to: determine whether the experience blocking ratio of the cell is greater than a preset target experience blocking ratio; when the experience blocking ratio of the cell is greater than the target experience blocking ratio, query a blocking ratio table based on the target experience blocking ratio, to obtain a quantity of equivalent channels that is of the cell and that corresponds to the target experience blocking ratio, where the blocking ratio table includes a correspondence between a quantity of equivalent channels of the cell, a service volume, and an experience blocking ratio; and adjust the quantity of equivalent channels of the cell to the quantity of equivalent channels that is of the cell and that corresponds to the target experience blocking ratio.

Optionally, the data volume of the session is obtained by subtracting a volume of data transmitted in the last transmission time unit from a total volume of successfully transmitted data, and the delay of the call is obtained by subtracting the last transmission time unit from a sum of a wait delay and a scheduling delay.

The network device provided in this embodiment may be configured to perform the method in Embodiment 3. A specific implementation principle and technical effects are similar to those of the method in Embodiment 3, and details are not described herein again.

Figure 8:
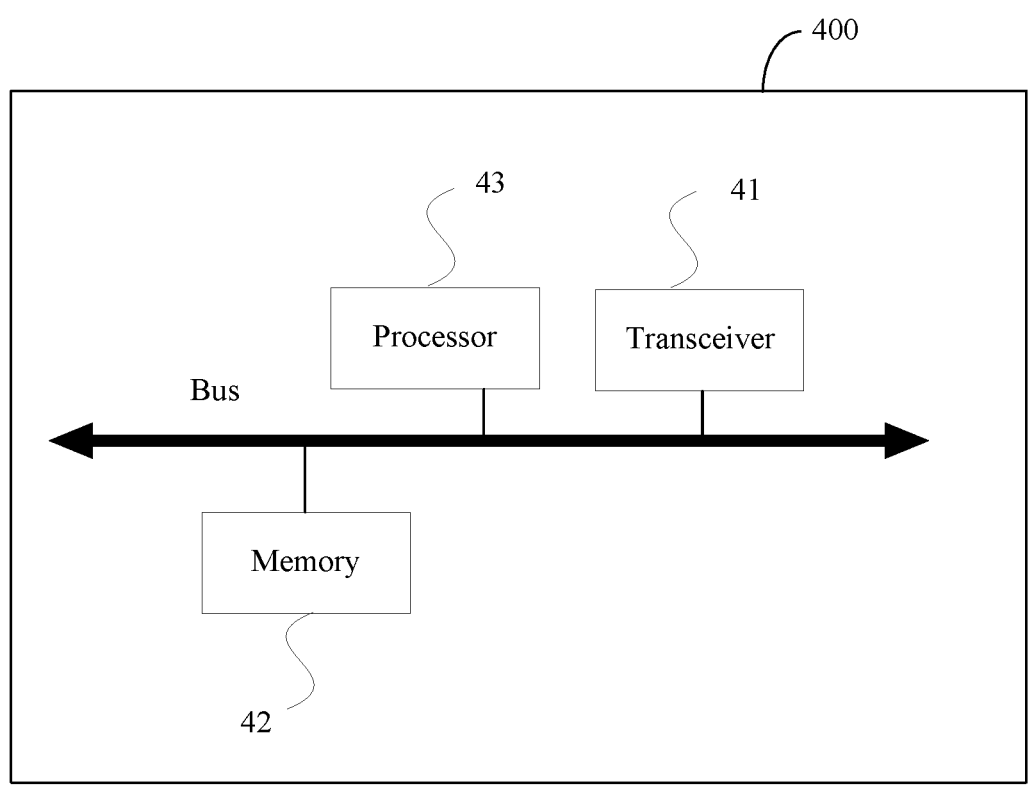
FIG. 8 is a schematic structural diagram of a network device according to Embodiment 7 of the present application.

FIG. 8 is a schematic structural diagram of a network device 400 according to Embodiment 7 of the present application. As shown in FIG. 8, the network device 400 includes: a transceiver 41, a processor 42, and a memory 43. The transceiver 41 and the memory 42 are connected to and communicate with the processor 43 via a bus. The memory 42 is configured to store an instruction. The transceiver 41 is configured to communicate with another network device. The processor 43 is configured to execute the instruction stored in the memory 42, so that the network device performs steps of the methods in Embodiment 1, Embodiment 2, and Embodiment 3. A specific implementation principle and technical effects are similar to those in the method embodiments, and details are not described herein again.

In the several embodiments provided in the present application, it should be understood that the disclosed apparatus and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of the present application may be integrated into one processing unit, or each of the units may exist alone physically, or two or more units may be integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor to perform some of the steps of the methods described in the embodiments of the present application. The foregoing storage medium includes: various media that can store program code, such as a universal serial bus (USB) flash drive, a removable hard disk, a read-only memory (ROM), a random access memory (RAM), a magnetic disk, or a compact disc.

The invention claimed is:

1. A network capacity adjustment method carried out by a network device, the method comprising:
    obtaining a quantity of concurrent users of a cell in a unit time in a statistics period;
    determining an experience blocking ratio of the cell in the statistics period based on:
        the quantity of concurrent users of the cell in the unit time, and
        a quantity of equivalent channels of the cell; and
    adjusting the quantity of equivalent channels of the cell based on the experience blocking ratio,
    wherein the determining an experience blocking ratio of the cell in the statistics period comprises:
        calculating, for the cell in the unit time:
            a first unsatisfied traffic volume, and
            a first satisfied traffic volume;
        calculating, for the cell in the statistics period and based on the first unsatisfied traffic volume and the first satisfied traffic volume:
            a second unsatisfied traffic volume, and
            a second satisfied traffic volume; and
        obtaining the experience blocking ratio of the cell based on a ratio of the second unsatisfied traffic volume to a total traffic volume of the cell in the statistics period; and
    wherein the quantity of equivalent channels of the cell is determined by:
        obtaining average spectral efficiency and spectral bandwidth of the cell, obtaining a total transmission rate (C) of the cell based on the average spectral efficiency and the spectral bandwidth, and obtaining the quantity of equivalent channels of the cell (N) according to the equation N=[C/Q], where Q is a required single-user rate.

2. The method according to claim 1, wherein the first unsatisfied traffic volume and the first satisfied traffic volume are determined as follows:

first determining that the quantity of concurrent users of the cell in the unit time is greater than the quantity of equivalent channels of the cell, and determining, in response to the first determining, that:

the first unsatisfied traffic volume=the quantity of concurrent users of the cell in the unit time, and the first satisfied traffic volume=0.

3. The method according to claim 1, wherein the adjusting the quantity of equivalent channels of the cell comprises:

first determining the experience blocking ratio is greater than a preset target experience blocking ratio;

querying, in response to the first determining, a blocking ratio table based on the target experience blocking ratio, to obtain a quantity of equivalent channels that is of the cell and that corresponds to the target experience blocking ratio, wherein the blocking ratio table comprises a correspondence between a quantity of equivalent channels of the cell, the experience blocking ratio, and a traffic volume; and adjusting the quantity of equivalent channels of the cell to the quantity of equivalent channels that is of the cell and that corresponds to the target experience blocking ratio.

4. A network device comprising:

a memory, and a processor, wherein the memory is configured to store instructions, and wherein the processor is configured to execute the instructions to facilitate the network device carrying out a method comprising:

obtaining a quantity of concurrent users of a cell in a unit time in a statistics period;

determining an experience blocking ratio of the cell in the statistics period based on:

the quantity of concurrent users of the cell in the unit time, and a quantity of equivalent channels of the cell; and adjusting the quantity of equivalent channels of the cell based on the experience blocking ratio, wherein the determining an experience blocking ratio of the cell in the statistics period comprises:

calculating, for the cell in the unit time:

a first unsatisfied traffic volume, and a first satisfied traffic volume;

calculating, for the cell in the statistics period and based on the first unsatisfied traffic volume and the first satisfied traffic volume:

a second unsatisfied traffic volume, and a second satisfied traffic volume; and obtaining the experience blocking ratio of the cell based on a ratio of the second unsatisfied traffic volume to a total traffic volume of the cell in the statistics period; and wherein the quantity of equivalent channels (N) of the cell is determined by:

obtaining average spectral efficiency and spectral bandwidth of the cell, obtaining a total transmission rate (C) of the cell based on the average spectral efficiency and the spectral bandwidth, and obtaining the quantity of equivalent channels of the cell (N) according to the equation N=[C/Q], where Q is a required single-user rate.

5. The network device according to claim 4, wherein the first unsatisfied traffic volume and the first satisfied traffic volume are determined as follows:

first determining that the quantity of concurrent users of the cell in the unit time is greater than the quantity of equivalent channels of the cell, and determining, in response to the first determining, that:

the first unsatisfied traffic volume=the quantity of concurrent users of the cell in the unit time, and the first satisfied traffic volume=0.

6. The network device according to claim 4, wherein the adjusting the quantity of equivalent channels of the cell comprises:

first determining the experience blocking ratio is greater than a preset target experience blocking ratio;

querying, in response to the first determining, a blocking ratio table based on the target experience blocking ratio, to obtain a quantity of equivalent channels that is of the cell and that corresponds to the target experience blocking ratio, wherein the blocking ratio table comprises a correspondence between a quantity of equivalent channels of the cell, the experience blocking ratio, and a traffic volume; and adjusting the quantity of equivalent channels of the cell to the quantity of equivalent channels that is of the cell and that corresponds to the target experience blocking ratio.

7. The method according to claim 1, wherein the first unsatisfied traffic volume and the first satisfied traffic volume are determined as follows:

second determining that the quantity of concurrent users of the cell in the unit time is less than or equal to the quantity of equivalent channels of the cell, and determining, in response to the second determining, that:

the first unsatisfied traffic volume=0, and the first satisfied traffic volume=the quantity of concurrent users of the cell in the unit time.

8. The method according to claim 1, wherein the first unsatisfied traffic volume and the first satisfied traffic volume are determined as follows:

third determining that the quantity of concurrent users of the cell in the unit time is greater than the quantity of equivalent channels of the cell, and determining, in response to the third determining, that:

(the first satisfied traffic volume)=(the quantity of concurrent users of the cell in the unit time)*(an actual single-user rate)/(a required single-user rate), and (the first unsatisfied traffic volume)=(the quantity of concurrent users of the cell in the unit time)*[1−(the actual single-user rate)/(the required single-user rate)], wherein the symbols "*" and "/" represent a multiplication and a division, respectively.

9. The method according to claim 1, wherein the first unsatisfied traffic volume and the first satisfied traffic volume are determined as follows:

fourth determining that the quantity of concurrent users of the cell in the unit time is less than or equal to the quantity of equivalent channels of the cell, and determining, in response to the third determining, that:

the unsatisfied traffic volume=0, and the satisfied traffic volume=the quantity of concurrent users of the cell in the unit time.

10. The network device according to claim 4, wherein the first unsatisfied traffic volume and the first satisfied traffic volume are determined as follows:
second determining that the quantity of concurrent users of the cell in the unit time is less than or equal to the quantity of equivalent channels of the cell, and determining, in response to the second determining, that:
the first unsatisfied traffic volume=0, and
the first satisfied traffic volume=the quantity of concurrent users of the cell in the unit time.

11. The network device according to claim 4, wherein the first unsatisfied traffic volume and the first satisfied traffic volume are determined as follows:
third determining that the quantity of concurrent users of the cell in the unit time is greater than the quantity of equivalent channels of the cell, and determining, in response to the third determining, that:
(the first satisfied traffic volume)=(the quantity of concurrent users of the cell in the unit time)*(an actual single-user rate)/(a required single-user rate), and (the first unsatisfied traffic volume)=(the quantity of concurrent users of the cell in the unit time)*[1−(the actual single-user rate)/(the required single-user rate)], wherein the symbols "*" and "/" represent a multiplication and a division, respectively.

12. The network device according to claim 4, wherein the first unsatisfied traffic volume and the first satisfied traffic volume are determined as follows:
fourth determining that the quantity of concurrent users of the cell in the unit time is less than or equal to the quantity of equivalent channels of the cell, and determining, in response to the third determining, that:
the unsatisfied traffic volume=0, and
the satisfied traffic volume=the quantity of concurrent users of the cell in the unit time.

* * * * *